United States Patent [19]

Summers et al.

[11] 4,306,250
[45] Dec. 15, 1981

[54] TELEVISION RECEIVER ARRANGEMENT HAVING MEANS FOR THE SELECTIVE USE OF SEPARATED OR LOCALLY GENERATED SYNCHRONIZING SIGNALS

[75] Inventors: Christopher P. Summers, London; Richard E. F. Bugg, Croydon; John R. Kinghorn, Sutton, all of England

[73] Assignee: U.S. Philips Corporation, New York, N.Y.

[21] Appl. No.: 179,125

[22] Filed: Aug. 18, 1980

Related U.S. Application Data

[63] Continuation of Ser. No. 945,064, Sep. 22, 1978, abandoned.

[30] Foreign Application Priority Data

Sep. 26, 1977 [GB] United Kingdom ............... 40032/77
May 30, 1978 [GB] United Kingdom ............... 40032/78

[51] Int. Cl.³ .......................... H04N 5/04; H04N 7/08
[52] U.S. Cl. .................................... 358/148; 358/147
[58] Field of Search ................. 358/12, 142, 147, 149; 340/721, 745, 789, 814

[56] References Cited

U.S. PATENT DOCUMENTS 3,288,920 11/1966 Baracket ........................ 358/149 X
3,588,351 6/1971 Baun ................................ 358/149

FOREIGN PATENT DOCUMENTS 461894 5/1973 Australia .
1370535 10/1974 United Kingdom ............... 358/142

OTHER PUBLICATIONS

Wireless World, vol. 81, No. 1479, pp. 498–504, Nov. 1975, Darrington, "Wireless World Teletext Decoder 1 The Background".
E.B.U. Review, No. 158, pp. 163–171, Aug. 1976, Pilz, "Techniques for Transmitting Subtitles for Television Programmes in Such a Way That Their Display is Optional".
Mullard Technical Information Article 34, Sep. 1976.
"Broadcast Teletext Specification", Sep. 1976, pub. by BBC, IBA & BREMA.

Primary Examiner—Bernard Konick
Attorney, Agent, or Firm—Thomas A. Briody; William J. Streeter; Edward W. Goodman

[57] ABSTRACT

In a television receiver adapted for the display of a normal television picture and/or message information in which both separated synchronizing signals and locally derived synchronizing signals are available, the selective use of one or the other of these two forms of synchronizing signals, having regard to different display circumstances, for the picture and message information display.

3 Claims, 1 Drawing Figure

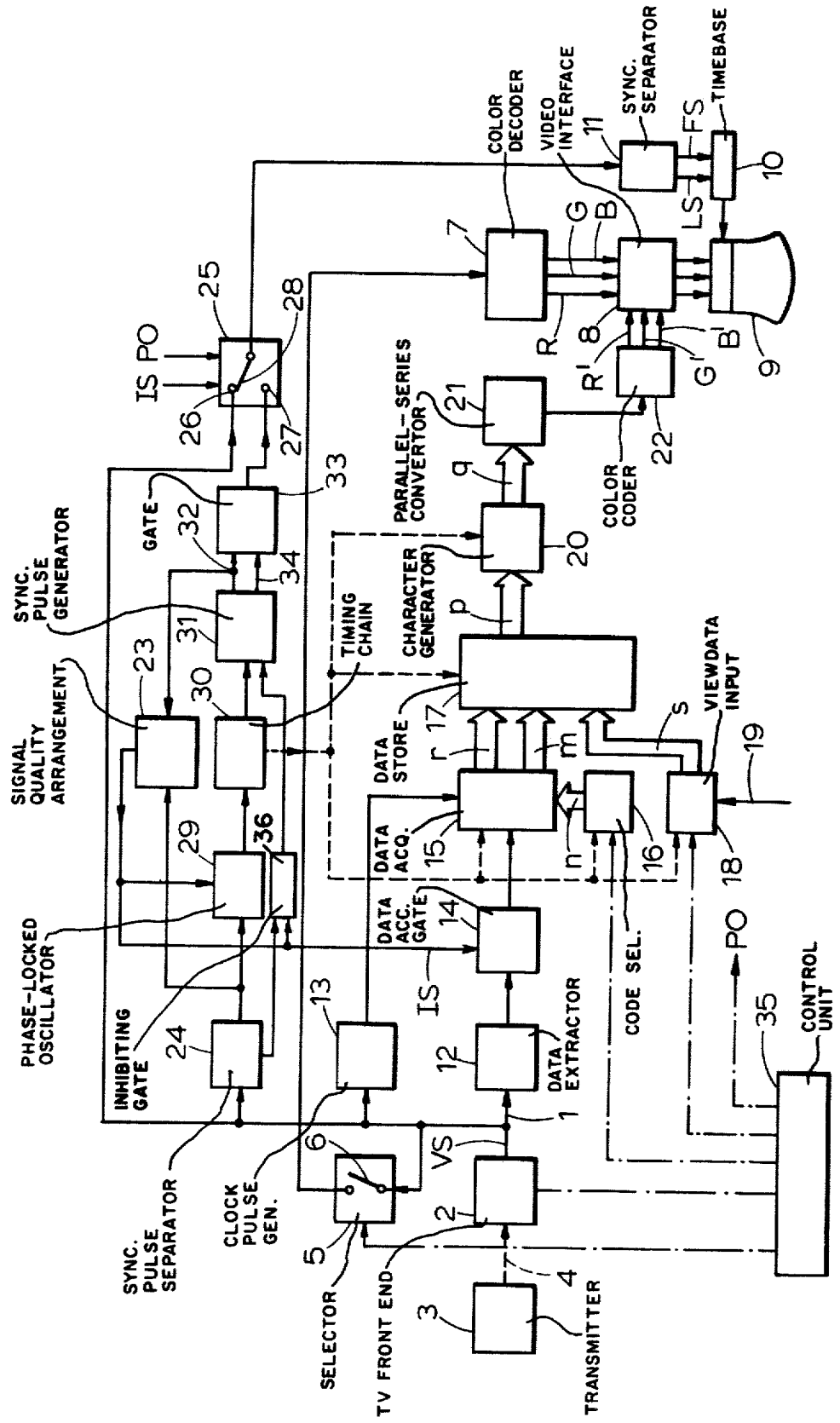

TELEVISION RECEIVER ARRANGEMENT HAVING MEANS FOR THE SELECTIVE USE OF SEPARATED OR LOCALLY GENERATED SYNCHRONIZING SIGNALS

This is a continuation, of application Ser. No. 945,064, filed Sept. 22, 1978. Now Abandoned.

BACKGROUND OF THE INVENTION

This invention relates to television receiver arrangements of a kind suitable for use in a television transmission system of a character in which coded data pulses representing alpha-numeric text or other message information are transmitted in a video signal in at least one television line in field-blanking intervals where no picture signals representing normal picture information are present, said television receiver arrangement including data selection and acquisition means for extracting selectively coded data pulses from a received video signal, a data store for storing the extracted coded data pulses, decoding means for producing from the stored coded data pulses a video signal which can be used to cause the display on a television screen of the particular message information represented by the stored coded data pulses, and oscillator means for producing locally generated synchronising signals within the television receiver arrangement itself, which locally generated synchronising signals can be used for the television display.

The television receiver arrangement may include suitable television display means, or it may be adapted to feed the video signal into a separate television receiver.

A television transmission system of the character referred to above is described in United Kingdom patent specification No. 1,370,535.

A television receiver arrangement of the above kind is known from Mullard Technical Information Article 34, dated September, 1976.

The use of oscillator means within a television receiver arrangement of the above kind to produce locally generated synchronising signals is also known from German Offenlegungshrift No. 26 51 635 in which the locally generated synchronising signals are produced for the television display of stored data in the absence of television synchronisation normally received (e.g. from a broadcast video signal containing synchronizing signals which can be separated out). The stored data which is for display may have been received either from a television video signal, or from a normal telephone transmission line. The television receiver arrangement described in this German Offenlegungsschrift is also organised such that it blocks the operation of a television synchronising separation stage and instead produces locally generated synchronising signals when a received television signal falls below a predetermined threshold level.

SUMMARY OF THE INVENTION

The present invention is based on the premise that in a television receiver arrangement of the kind referred to in which both separated synchronising signals and locally generated synchronising signals can be made available, the selective use of one or the other of these two forms of synchronising signals, having regard to different display circumstances, affords considerable advantages in the performance of the arrangement as compared with the simple alternative of using the locally generated synchronising signals only when the separated synchronising signals are not available due to the absence or unsuitability of a received television signal.

According to the invention, a television receiver arrangement of the kind referred to is characterised in that it includes means for causing separated synchronising signals to be used for the television display when normal television picture display is selected, means for causing locally generated synchronising signals to be used for the television display when message information display is selected and means for phase-locking the locally generated synchronising signals to the separated synchronising signals when a suitable video signal is being received.

For the purposes of the present specification, a "suitable video signal" is to be understood to be one which is not so "noise-corrupted" that coded data pulses which are extracted therefrom are likely to result in an unintelligible display.

In a television receiver arrangement according to the invention, it has been found that by using the locally generated synchronising signals for the television display of message information there is the advantage that there tends to be less "jitter" in the display, compared with using separated synchronising signals. By phase-locking the locally generated synchronising signals to the separated synchronising signals, whenever possible, there is the further advantage that the locally generated synchronising signals can then also be used for synchronisation purposes in the acquisition of coded data pulses from an incoming video signal.

As a modification, means may be provided for inhibiting the use of the separated synchronising signals for the television display when normal television picture display is selected and for using instead the locally generated synchronising signals, if the received video signal is not suitable in that it is unacceptably "noise-corrupted," as aforesaid. This has the advantage that the television picture display is unlikely to be degraded any further, but that there can now be an intelligible superimposed display on the picture display of any pre-stored data, such as channel information as may be generated by a television remote control device.

The invention also extends to a television receiver arrangement of the kind referred to and as set forth above, embodied in a television transmission system of the character referred to. Also, such a television receiver arrangement with the aforesaid selective use of either separated or locally generated synchronising signals can be adapted to cause the display of aphanumeric text or other message information concurrently with, or as a selectable alternative to normal picture information.

DESCRIPTION OF THE DRAWING

In order that the invention may be more fully understood reference will now be made by way of example to the accompanying drawing in which the single FIGURE is a block diagram of a television transmission system of the character referred to embodying a television receiver arrangement according to the invention.

DESCRIPTION OF THE PREFERRED EMBODIMENT

The drawing shows a television transmission system of the character referred to having a television receiver arrangement for displaying selectively either a television picture which is produced from picture information in a normal broadcast or cable television video signal, or alpha-numeric text or other message information which is produced from coded data pulses which are transmitted in the video signal in vertical- or field-blanking intervals thereof. The possibility can also exist for displaying such message information concurrently with a television picture, for instance as sub-titles or captions which are superimposed on the television picture. The television receiver arrangement is also adapted to receive and display message information received from another source, such as Viewdata information as transmitted over a telephone line in the experimental British Post Office Viewdata System (see Wireless World, February-May, 1977).

The incoming television video signal VS appears at an input lead 1 of the television receiver arrangement via its front end 2 which comprises the usual amplifying, tuning, i.f. and detector circuits. The front end 2 is assumed to be coupled to a television transmitter 3 via a conventional over-air broadcast or cable transmission link 4. The transmitter 3 includes in known manner means for producing television picture information, means for producing alpha-numeric text or other message information, and further means for generating the appropriate composite television video signal containing picture signals representative of the picture information, and coded data pulses representative of the message information, together with the usual synchronising, equalizing and blanking signals which are necessary for the operation of the television receiver arrangement.

For the normal picture display in the television receiver arrangement, the received video signal VS is applied to a selector circuit 5 which includes a selector switch 6. When the switch 6 is closed, the video signal VS is applied to a colour decoder 7 which produces the R, G and B component signals for the picture display, these component signals being applied via a video interface circuit 8 to the red, green and blue guns of a colour television picture tube 9. Timebase circuits 10 for the tube 9 receive the usual line and field synchronising pulses LS and FS from a sync. separator circuit 11 which extracts these synchronising pulses from the incoming video signal VS, or from locally generated synchronising signals, as will be described.

Coded data pulses representing message information in the video signal VS do not affect the picture display because they occur in one or more lines in the field-blanking interval when there is no picture display. Of the lines occurring in the field-blanking interval, most could be used to transmit coded data pulses representing message information. However, in the experimental BBC/IBA Teletext System for which the present invention was originally conceived, it is proposed at present to restrict such use to lines 17/18 of even fields and lines 330/331 of odd fields of the 625 line broadcast television system used in the United Kingdom. (See "Broadcast Teletext Specification", September 1976, published jointly by the British Broadcasting Corporation, Independent Broadcasting Authority and British Radio Equipment Manufacturers' Association).

The video signal VS on the input load 1 is also applied to data selection and acquisition means comprising a data extractor circuit 12, a data clock pulse generator 13, a data acceptor gate 14 and a data acquisition circuit 15. It is assumed that the message information represented by the coded data pulses contained in the video signal VS is divided into different pages of information, and that each page is for display as a whole on the screen of the picture tube 9 with the coded data pulses representing each page of information being repeated periodically with or without updating of the information. It is further assumed that each page of message information is identified by means of a unique page address code which is included in the coded data pulses and defines the page number. A code selector circuit 16 controls the particular coded data pulses that are acquired by the data acquisition circuit 15 at any time. (This control is indicated by a broad-narrow connection representing the presence of n parallel channels which form an n bit channel link for carrying n bits of information required for data selection—other groups of parallel channels forming multi-bit channel links in the television receiver arrangement are represented similarly as m, p, a, r, and s numbers of channels and bits of information).

The acquired coded data pulses are clocked serially into the data acquisition circuit 15 by the clock pulse output from the clock pulse generator 13. From the data acquisition circuit 15, the acquired coded data pulses are fed to a data store 17 over an m-bit channel link, m bit bytes being required for each character (or other item of information) contained in the message information, where m=7, for example.

The data store 17 can store a complete page of message information. In a typical Teletext transmission, each page of message information would contain up to 2- rows of characters, with each row containing up to 40 characters. Thus, in order to identify the different characters of a page, it is furthermore assumed that the coded data pulses also include an address code for each character, this address code employing r bits and being fed to the data store 17 from the data acquisition circuit 15 over an r-bit channel link.

In view of the restricted transmission time which is available for transmitting the coded data pulses representing message information, for instance, sufficient time to transmit the coded data pulses for only one character row during a television line in the field-blanking interval, character data for a page of message information has to be stored row-by-row in the data store 17 over a relatively large number of television fields. This storing of character data row-by-row in the data store 17 is under the control of the address codes received from the data acquisition circuit 15 over the r-bit channel link. Coded data pulses can also be fed into the store 17 over an s-bit channel link from Viewdata input circuits 18, these latter coded data pulses being received via a telephone (not shown) from a telephone line 19. Another message information source from which the data store 17 can receive coded data pulses may be, for instance, a video cassette player.

The television receiver arrangement further includes decoding means comprised by a character generator 20 and a parallel-to-serial convertor 21. The character generator 20 is responsive to the character data stored in the data store 17 to produce character generating data which can be used to derive what is effectively a new picture signal for displaying the characters represented by the stored character data. As mentioned previously, different characters can be represented by respective m-bit bytes. The bits of each byte are fed in parallel from the data store 17 to the character generator 20 as p-bit bytes. A character format for characters to be displayed can be a co-ordinate matrix composed of discrete elements arranged in rows and columns, this format being derived from a "read-only" memory which serves as the character generator 20 and which provides bits of character generating data in rows and columns, one row at a time. Since the character generating data is required as a modulation of a video signal in order to produce selective bright-up of the screen of the picture tube 9 to achieve character display, the character generating data is produced serially (as 1's and 0's) by using the convertor 21 to convert each row of bits of data read out from the character generator 20 (e.g. a=5) into serial form.

In order to effect character display on the screen of the picture tube 9 using standard line and frame scans, the logic of the television receiver arrangement in respect of character display is so organised that for each row of characters to be displayed, all the characters of the row are built up television line-by-television line as a whole, and the rows of characters are built up in succession. It takes a number of television lines to build up one row of characters. In the first television line character data from the data store 17 to the character generator 20 would cause the latter to produce character generating data with respect to the first row of discrete elements for the first character of the row, then with respect to the first row of discrete elements for the second character, and so on for the successive characters of the row. In the second television line, character generating data with respect to the second row of discrete elements for each character of the row would be produced in turn, and so on for the remaining television lines concerned.

The output from the convertor 21 is applied to a colour coder 22 which produces R', G' and B' component signals for character display, these component signals being also applied to the video interface circuits 8. The colour coder 22 can be controlled (in a manner not shown) by selected items of the character data in the data store 17 to provide a controlled colour display. Of course, black-and-white picture and character display is also possible, in which event the colour decoder 7 and colour coder 22 would be omitted.

The television receiver arrangement includes, as aforesaid, as part of the data selection and acquisition means, a data acceptor gate 14. The coded data pulses extracted from the incoming video signal VS by the data extracter circuit 12 are applied to the data acquisition circuit 15 via this acceptor gate 14 which is controlled by a signal quality arrangement 23. This arrangement 23 is responsive to apply an inhibiting signal IS to the data acceptor gate 14 to inhibit the acceptance for storage of coded data pulses when a predetermined signal-to-noise ratio in the incoming video signal VS is exceeded. The arrangement 23, which may comprise the serial combination of an AND-gate, an integrator, a threshold detector and a Schmitt trigger circuit, determines an acceptable signal-to-noise ratio by comparing line synchronizing pulses, separated from the received video signal, with locally generated "clean" line synchronizing pulses, both of which are applied to the AND-gate of the arrangement 23 with the inhibiting signal IS appearing at the output of the Schmitt trigger circuit. Noise, sufficient to cause break-up of the separated line synchornizing pulses, will cause a similar break-up in the output of the AND gate. By selecting a suitable threshold in the threshold circuit, the voltage output from the integrator will trip the threshold detector which thereupon causes the Schmitt trigger circuit to generate the inhibiting signal IS. When the separated line synchronizing pulses are "clean", the resulting "clean" pulses from the AND-gate will cause an increase in the output voltage of the integrator which voltage is now above the threshold in the threshold detector which then terminates the signal IS from the Schmitt trigger circuit.

Considering now the selective usage of separated synchronising signals and locally generated synchronising signals, the incoming video signal VS is further applied to a sync. pulse separator 24 and to an electronic switch 25 (which for the sake of simplicity is represented by a mechanical changeover contact having fixed terminals 26 and 27 and a changeover contact 28). The separated sync. pulses produced by the sync. pulse separator 24 are applied to a phase-locked oscillator 29 which drives a timing chain 30, and to one input of the signal quality arrangement 23. The timing chain 30 provides appropriate clock and timing pulses to the data acquisition circuit 15, the code selector circuit 16, the data store 17, the Viewdata input circuits 18 and the character generator 20. The timing chain 30 also drives synchronising pulse generator 31 which produces the locally generated synchronising signals in response to the output received by it from the timing chain 30. Locally generated line sync. pulses are applied via a lead 32 to a second input of the signal quality arrangement 23. Also, these locally generated line sync. pulses are combined in a gate 33 with field sync. pulses which are produced by the generator 31 on a lead 34, and which are synchronised with the incoming field sync. pulses supplied by the sync pulse separator 24 via an inhibiting gate 36. The output of the gate 33 is applied to the switch 25.

A user control unit 35, which may be a hand-held remote control device of any suitable known form, controls channel selection and adjustment, etc., at the front end 2 and selector switch 5; and also the code selector 16 and the Viewdata circuits 18 for the selection of either form of message information. When a normal picture channel has been selected and the broadcast video signal concerned is being received, a "picture on" signal PO produced by the user control unit 35 causes the switch 25 to assume the position shown with contact 28 engaging terminal 26 so that the incoming video signal VS is applied to the sync. separator circuit 11. As a result, separated synchronising signals are used to control the time bases 10.

When Teletext or Viewdata message information is selected, the signal PO is terminated and the switch 25 then assumes the position in which contact 28 engages terminal 27 so that now the locally generated synchronising signals from the pulse generator 31 are applied to the sync. separator circuit 11. As a result, the locally generated synchronising signals are now used to control the time bases 10. In each of these two instances, the operation of the time bases 10 is synchronised with the incoming video signal VS, in the first instance directly and in the second instance because the oscillator 29 is phase-locked to the incoming video signal VS.

If the signal quality becomes unacceptable or there is no incoming video signal, then the inhibiting signal IS from the signal quality arrangement 23 unlocks the oscillator 29 to allow it to free-run, and also inhibits the application of the field sync. pulses to the generator 31 by activating the inhibiting gate 36. The locally generated synchronising signals are thus still produced but are not synchronised with any incoming video signal.

When a video signal is present, the signal IS also, of course, inhibits the acceptor gate 14 to prevent the reception and storage of noise-corrugated coded data pulses.

As a modification the switch 25 may also be controlled by the inhibiting signal IS such that even when the "picture on" signal PO is present locally generated synchronising signals are selected in preference to separated synchronizing signals when the signal quality is sufficiently bad to cause the production of the inhibiting signal IS. This permits an intelligible superimposed display on the picture display of any prestored data, such as channel information as may be generated by the unit 35.

We claim:

1. A television receiver arrangement of a kind suitable for use in a television transmission system of a character in which coded data pulses representing alpha-numeric text or other message information are transmitted in a video signal in at least one television line in field-blanking intervals where no picture signals representing normal picture information are present, said television receiver arrangement including means for separating synchornizing signals from said video signal, data selection and acquisition means for extracting selectively coded data pulses from a received video signal, a data store for storing the extracted coded data pulses, decoding means for producing from the stored coded data pulses a video signal which can be used to cause the display on a television screen of the particular message information represented by the stored coded data pulses, the oscillator means for producing locally generated synchronising signals within the television receiver arrangement itself, which locally generated synchronising signals can be used for the television display; wherein said television receiver arrangement further comprising means for selectively switching between a normal television picture display and said message information display, means for causing said separated synchronising signals to be used for the television display when normal television picture display is selected, means for causing locally generated synchronising signals to be used for the television display when message information display is selected, means for detecting a suitable video signal, and means for phase-locking the locally generated synchronising signals to the separated synchronising signals when a suitable video signal is being received.

2. A television receiver arrangement as claimed in claim 1, wherein said selectively switching means is adapted to cause the display of alpha-numeric text or other message information concurrently with, or as a selectale alternative to, normal picture information.

3. A television receiver arrangement as claimed in claim 1, which further comprises means for inhibiting the use of the separated synchronizing pulses for the television display when normal television picture display is selected and for using instead the locally generated synchronizing signals if the received video signal is not suitable.

* * * * *